Patented Sept. 3, 1946

2,407,151

UNITED STATES PATENT OFFICE 2,407,151

EXPLOSIVE COMPOSITION

Richard C. Glogau, Woodbury, N. J., assignor to E. I. du Pont de Nemours & Company, Wilmington, Del., a corporation of Delaware No Drawing. Application August 17, 1944, Serial No. 549,959

12 Claims. (Cl. 52—14)

This invention relates to a method of treating water-soluble materials and of effecting thereby a marked decrease in their tendency to become set or caked in hard masses. More particularly it relates to ammonium nitrate so treated and to explosive compositions containing considerable amounts of this salt.

Ammonium nitrate is an important ingredient of explosive compositions because of its attractive properties and its availability. It has the disadvantage, however, of being highly hygroscopic and of absorbing water or moisture very readily. Largely for this reason, ammonium nitrate on storage tends to set and become caked in solid masses that can be broken up only with great difficulty. This caking tendency has a desensitizing effect on the ammonium nitrate and under very adverse conditions may render explosives containing it incapable of satisfactory execution.

Other water-soluble compounds and salts exhibit the same tendency to set, and various methods have been proposed for overcoming this disadvantage. No entirely satisfactory means has been found, however, for solving the problem.

An object of the present invention is a method for preventing the caking of water-soluble, granular compounds. A further object is such a method which can be used effectively in the preparation of explosives containing ammonium nitrate and other water-soluble salts. A still further object is a composition of matter of greatly increased resistance to setting because of a novel method of treatment. A further object is a composition comprising ammonium nitrate coated with an effective anti-setting agent. Additional objects will be disclosed as the invention is described more at length hereinafter.

I have found that the foregoing advantages are accomplished when I coat the particles of ammonium nitrate with a finely divided, silicon-containing compound. The silicon-containing compound found effective by me is taken from the group consisting of the difficultly soluble inorganic silicates and precipitated silica. While varying amounts of the silicon-containing coating may be used with advantageous effect on the properties of the salt coated, I preferably use between 0.05% and 5% of the coating agent, since an amount lower than 0.05% is insufficient to give adequate protection, while more than 5% means unnecessary contamination with foreign inert material with little further protection. Ammonium nitrate so protected possesses a greatly decreased tendency to set and has improved free flowing properties. As has been stated, satisfactory silicon-containing compounds for use must be such as are difficultly soluble in water. Sodium silicate, for example, is not applicable. Likewise, naturally occurring silica is not suitable, whether granular or occurring in a form such as kieselguhr.

While various silicon-containing compounds are applicable in accordance with my invention for protecting the ammonium nitrate grains, I find finely divided calcium silicate particularly effective. A suitable form is the one obtained by precipitation from a solution of a calcium salt by means of sodium or other soluble silicate. A dried product having a particle diameter for at least 50% of the grains of not less than 1 micron is desirable for use. Amorphous precipitated silica also is a satisfactory coating agent, and this and other silicate coatings should be in very finely divided form. With a particle diameter of the magnitude mentioned, the coating material will be of such a degree of fineness as to be readily capable of passing through a 325-mesh screen.

The silica or silicate coating may be applied to the ammonium nitrate by various methods and at various stages in the treatment of the salt. It may be added during the graining process, if desired, or to the final ammonium nitrate product by agitating the mixture of ammonium nitrate and coating agent. As previously stated, I have found a suitable amount of calcium silicate or other analogous material for use to be between 0.05% and 5.0%, based on the weight of the water-soluble salt to be coated.

The beneficial effect of the silicate coating in preventing undue setting of ammonium nitrate was shown by tests carried out on treated samples. Hot, dry ammonium nitrate was screened, introduced with the desired amount of coating material into 32-oz. bottles, and mixed for 10–15 minutes, after which 90-gram portions of the respective mixtures were placed in iron pipe sections 3 inches long and 2 inches in diameter, the material being compressed with a 25-lb. weight and then tightly stoppered. The samples thus prepared were stored alternately under hot (43–49° C.) and normal (20° C.) conditions, each sample remaining three days at each temperature. The material was passed through the transition point (32° C.) as many times as desired, maintained in upright position. The compressed pellets were then removed from the tubes and the pressure determined which was necessary to crush them. Increased pressure indicated setting of the salt. The following results were obtained:

| Setting inhibitor | Amount, percent | Crushing pressure, pounds, passages through transition point | | | |
|---|---|---|---|---|---|
| | | 1 | 2 | 3 | 4 |
| None | | 11 | 10 | 15 | 25 |
| Silica | 1 | 6 | 7 | 4 | 14 |
| Calcium silicate | 0.5 | 4 | 3 | 10 | 2 |
| | 1.0 | 3 | 2 | 3 | 7 |

The protection against setting offered by the calcium silicate coating is plainly brought out in the above tabulation.

The compositions of my invention are advantageous not only from the viewpoint of prevention of setting, but for other purposes also. The coating of the ammonium nitrate particles with the finely divided silicon-containing compound likewise protects the material from water and moisture penetration, and causes the salt to remain in free flowing condition so that it can be poured more readily. The improved coating of my invention has the advantage over other materials used that it is inert and non-reacting with respect to the salt coated or to materials with which the salt is mixed. Organic coating agents suffer from the drawback that they are reactable with oxidizing agents, so that some hazard may be introduced with such combinations at elevated temperatures.

Storage tests of dynamite compositions high in ammonium nitrate content demonstrated that calcium silicate and other silicon-containing compounds within the scope of my invention in finely divided state acted effectively as anti-setting agents for the mixed explosives.

Particular mention has been made of the application of the silicon-containing compounds of my invention as an inhibiting coating on ammonium nitrate. A similar beneficial effect is likewise obtained when the same coating is used for other water-soluble materials, especially such inorganic compounds as sodium nitrate, sodium nitrite, and the like.

It will be understood that the coated materials described in the foregoing may be used by themselves or be present as ingredients of various compositions. I intend to be limited only by the following patent claims.

I claim:

1. A method of preventing the caking of explosive compositions containing ammonium nitrate, which comprises coating the ammonium nitrate particles with a finely divided material taken from the group consisting of the difficultly soluble inorganic silicates and precipitated silica.

2. A method of preventing the setting of water-soluble granular materials which comprises coating the grains of said materials with a finely divided compound taken from the group consisting of the difficultly soluble inorganic silicates and precipitated silica.

3. The method of claim 2, in which the coating compound is of a fineness such that the particle diameter of at least 50% thereof is less than 1 micron.

4. The method of claim 2, in which the material is coated with calcium silicate.

5. An explosive composition of increased resistance to setting comprising a water-soluble inorganic oxidizing agent coated with a finely divided material taken from the group consisting of the difficultly soluble inorganic silicates and precipitated silica.

6. An explosive composition of increased resistance to setting comprising ammonium nitrate coated with a finely divided material taken from the group consisting of the difficultly soluble inorganic silicates and precipitated silica.

7. A composition of matter comprising a water-soluble compound coated with a finely divided material taken from the group consisting of the difficultly soluble inorganic silicates and precipitated silica.

8. The composition of claim 7, in which the water-soluble compound is sodium nitrite.

9. The composition of claim 7, in which the water-soluble compound is sodium nitrate.

10. The composition of claim 7, in which the water-soluble compound is ammonium nitrate.

11. A composition comprising ammonium nitrate having its individual particles coated with a finely divided silicon-containing compound in an amount between 0.05% and 5% by weight of the ammonium nitrate, said coating compound being taken from the group consisting of the difficultly soluble inorganic silicates and precipitated silica.

12. The composition of claim 11, in which the silicon-containing compound is precipitated calcium silicate.

RICHARD C. GLOGAU.